(12) United States Patent
Sato

(10) Patent No.: US 7,643,691 B2
(45) Date of Patent: Jan. 5, 2010

(54) IMAGE PROCESSING APPARATUS AND IMAGE PROCESSING METHOD

(75) Inventor: Yukimasa Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 11/249,703

(22) Filed: Oct. 13, 2005

(65) Prior Publication Data

US 2006/0087667 A1    Apr. 27, 2006

(30) Foreign Application Priority Data

Oct. 26, 2004   (JP) ............................. 2004-311415

(51) Int. Cl.
| G06K 9/36 | (2006.01) |
| G06K 9/48 | (2006.01) |
| G06K 9/46 | (2006.01) |
| H04N 1/32 | (2006.01) |
| H04N 1/00 | (2006.01) |
| G09G 1/10 | (2006.01) |
| G09G 1/14 | (2006.01) |
| G06T 11/20 | (2006.01) |
| G06T 11/00 | (2006.01) |

(52) U.S. Cl. .................. 382/242; 382/243; 358/426.01; 345/17; 345/23; 345/441; 345/467

(58) Field of Classification Search ................. 382/232, 382/241–243; 358/426.01–426.16; 345/17, 345/23–26, 441, 467
See application file for complete search history.

(56) References Cited

FOREIGN PATENT DOCUMENTS

| CN | 1123923 A | 6/1996 |
| JP | 08-194458 | * 7/1966 |
| JP | 8-063144 A | 3/1996 |
| JP | 8-194458 A | 7/1996 |

* cited by examiner

Primary Examiner—Brian P Werner
Assistant Examiner—Randolph Chu
(74) Attorney, Agent, or Firm—Canon U.S.A., Inc. I.P. Division

(57) ABSTRACT

An image processing apparatus holds a compressed image without being subjected to edging, or holds an edged image of the image after the image is subjected to edging, depending on predetermined conditions. The image processing apparatus creates an image on the basis of an edged image created from the compressed image held by a holding unit or on the basis of the held edged image held by the holding unit. Therefore, an optimal performance suitable for the capability of the image processing apparatus is realized.

19 Claims, 10 Drawing Sheets

IMAGE PROCESSING APPARATUS AND IMAGE PROCESSING METHOD

BACKGROUND OF THE INVENTION

1. Field of the Invention

The present invention relates to an image processing apparatus, method, and program related to various techniques for performing edging on a drawn object, including a graphic and a character, and of creating an output image from the drawn object subjected to edging during rendering.

2. Description of the Related Art

Some conventional image processing apparatuses do not embed a drawn object, such as a character, a graphic, or the like, into intermediate code without processing the drawn object, but do extract edges from bitmap data of the drawn object, create edge data by vectorizing the edges, and store the edge data in the intermediate code.

Image processing apparatuses that can perform rendering convert the edge data into output images. This enhances the calculation speed of drawing logic of multiple image objects to improve processing speed.

One such system is, for example, a character recognizing apparatus disclosed in Japanese Patent Laid-Open No. 8-194458. The apparatus shown in this patent document reduces the time required for determining whether or not to perform compression and also compresses only dot data, which has an advantageous effect of compression, to improve efficiency in the use of font cache memory.

However, since the size of compressed character data is smaller than that of edge data, storing data in the form of edge data results in reduced memory efficiency.

In addition, when a memory area for storing intermediate code is fully occupied, it is necessary to delete the intermediate code for all pages after performing rendering on the intermediate code or to free the memory area for storing the intermediate code by temporarily performing rendering on the intermediate code. This processing decreases the processing speed.

A decrease in memory efficiency may cause a decrease in processing speed. In particular, in the case in which creating images from the intermediate code is performed in hardware, when the time for computing drawing logic is sufficiently shorter than that for creating the intermediate code, it is important to avoid processing for improving memory efficiency and for ensuring there is sufficient memory available.

For a technique of performing edging on characters every time in a system in which images are created on the basis of edges, the characters are often used multiple times in the same data. Therefore, this technique decreases printing speed in a system for performing edging every time during rendering. As a result, a system that has no unit to perform edging at high speed suffers from a decrease in the processing speed.

One solution is to enhance the processing speed by incorporating an accelerator for improving a function of performing edging on compressed data and processing capability, but this increases the cost of the overall system.

SUMMARY OF THE INVENTION

In view of these problems, the present invention realizes optimal performance suitable for the capability of an image processing apparatus.

According to an aspect of the present invention, an image processing apparatus includes a holding unit configured to hold a compressed image of an image after the image is compressed without being subjected to edging, or to hold an edged image of the image after the image is subjected to edging, depending on predetermined conditions; and a creating unit configured to create an image on the basis of an edged image created from the compressed image held by the holding unit, or on the basis of the held edged image held by the holding unit.

In an image processing apparatus according to at least one exemplary embodiment, during conversion of print data to intermediate code, a drawn object including a graphic and a character is subjected to edging, and during rendering, an output image is created from the drawn object subjected to edging. The image processing apparatus includes a storing unit configured to store on a font cache, a character image compressed in the print data, an embedding unit configured to embed the compressed character image in intermediate code, an edging unit configured to perform edging directly on the compressed character image embedded in the intermediate code during the rendering to create edge data, and a rendering unit configured to perform rendering using the edge data created by the edging unit.

According to at least one exemplary embodiment, storing the compressed character data in the intermediate code improves the efficiency in the use of a memory area storing the intermediate code. In addition, the storage form of a character image can be optimally varied with the capability of the image processing apparatus, thus enabling optimal performance suitable for the capability of the image processing apparatus.

According to another feature of at least one exemplary embodiment, when the presence of an accelerator for creating edge data from compressed data is detected, the apparatus is then switched so as to store an image in the form of compressed data. Therefore, the memory is used more efficiently. When the presence of the accelerator is not detected, the apparatus is then switched so as to store the image in the form of edge data, thus preventing a decrease in performance.

According to another feature of at least one exemplary embodiment, processing for freeing the memory area for storing the intermediate code or the memory area of the font cache is not necessary, thus enhancing the printing speed.

According to another feature of at least one exemplary embodiment, a system in which the processing speed and the memory efficiency are balanced is realized in response to a change in memory capacity (e.g., memory addition) of the image processing apparatus.

Further features of the present invention will become apparent from the following description of exemplary embodiments with reference to the attached drawings.

DESCRIPTION OF THE EMBODIMENTS

First Exemplary Embodiment

Figure 1:
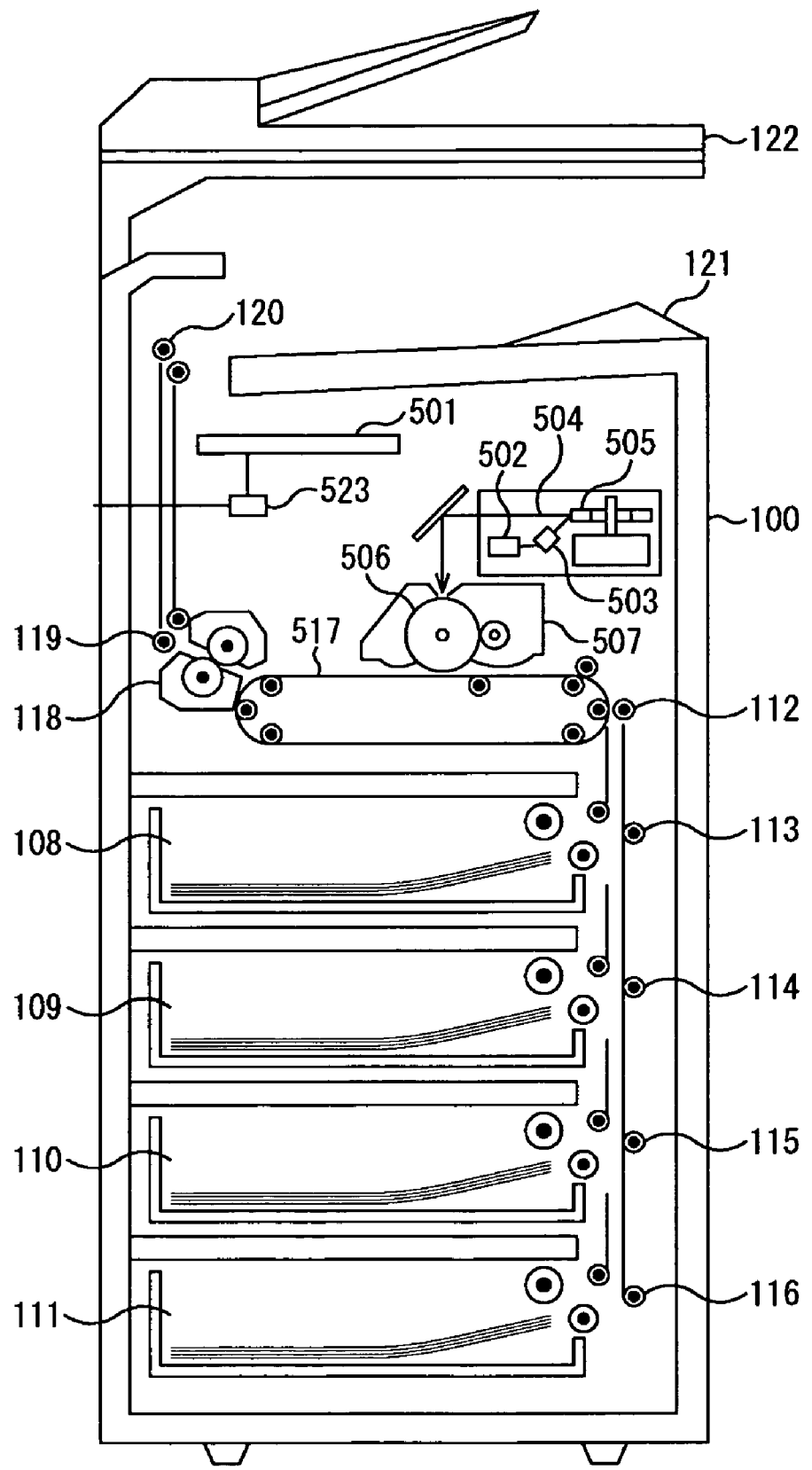
FIG. 1 is a sectional view showing a schematic structure of a multifunction product (MFP), according to at least one exemplary embodiment of the present invention.

FIG. 1 shows a sectional view illustrating an exemplary internal structure of a multifunction product (MFP), which functions as a printer, a copier, and a facsimile machine, according to an exemplary embodiment of the present invention.

In FIG. 1, an MFP 100 can be used as a network printer, which prints print data received over a network. The MFP 100 is also connected to a telephone line, so that the MFP 100 can be used as a facsimile machine. Additionally, the MFP 100 can be used as a copier on a standalone basis.

An operating panel 121 includes a switch for operation and a liquid-crystal touch panel for displaying the status of the MFP 100. The MFP 100 includes a control unit 501 for controlling the operation of the MFP 100.

A laser driver 502 circuit is provided for driving a semiconductor laser oscillator 503. The laser driver 502 switches a laser beam 504 to be emitted from the semiconductor laser oscillator 503 between on and off states in response to an input video signal.

The laser beam 504 forms an electrostatic image on an electrostatic drum 506 by scanning the electrostatic drum 506 after the direction of the laser beam 504 is horizontally changed by a polygon mirror 505. The electrostatic image is developed by a developing unit (toner cartridge) 507 disposed around the electrostatic drum 506 and is subsequently transferred to recording paper.

The recording paper is cut-sheet paper. The cut-sheet paper is held in sheet paper cassettes 108, 109, 110, and 111 attached to the MFP 100. A sheet of recording paper is picked up by paper feed rollers 113, 114, 115, or 116 and is then placed on a paper conveying belt 517 by a paper conveying roller 112. The sheet of recording paper passes through an image-forming and developing mechanism while being conveyed by the paper conveying belt 517.

Toner (powder ink) transferred to a sheet of recording paper is fused (fixed) by heat and pressure at a fuser 118. The sheet of recording paper on which toner is fused is ejected from the MFP 100 by transporting rollers 119 and 120.

When a user sets a document in a scanner 122 and provides an instruction to copy it using the operating panel 121, the document is fed into a document table and exposed to light from a halogen lamp (not shown), so that a reflected image thereof is captured. The captured image is changed from analog to digital form, sent to the control unit 501, and is then subjected to appropriate processing, so that it is converted into a video signal (an image signal). The video signal is then input to the laser driver 502.

Print data is sent over an external network, analyzed in the control unit 501, converted to a video signal, and is then input to the laser driver 502. Facsimile data is transmitted through a telephone line, sent to the control unit 501 via a modem 523, converted to a video signal, and is then input to the laser driver 502.

Figure 2:
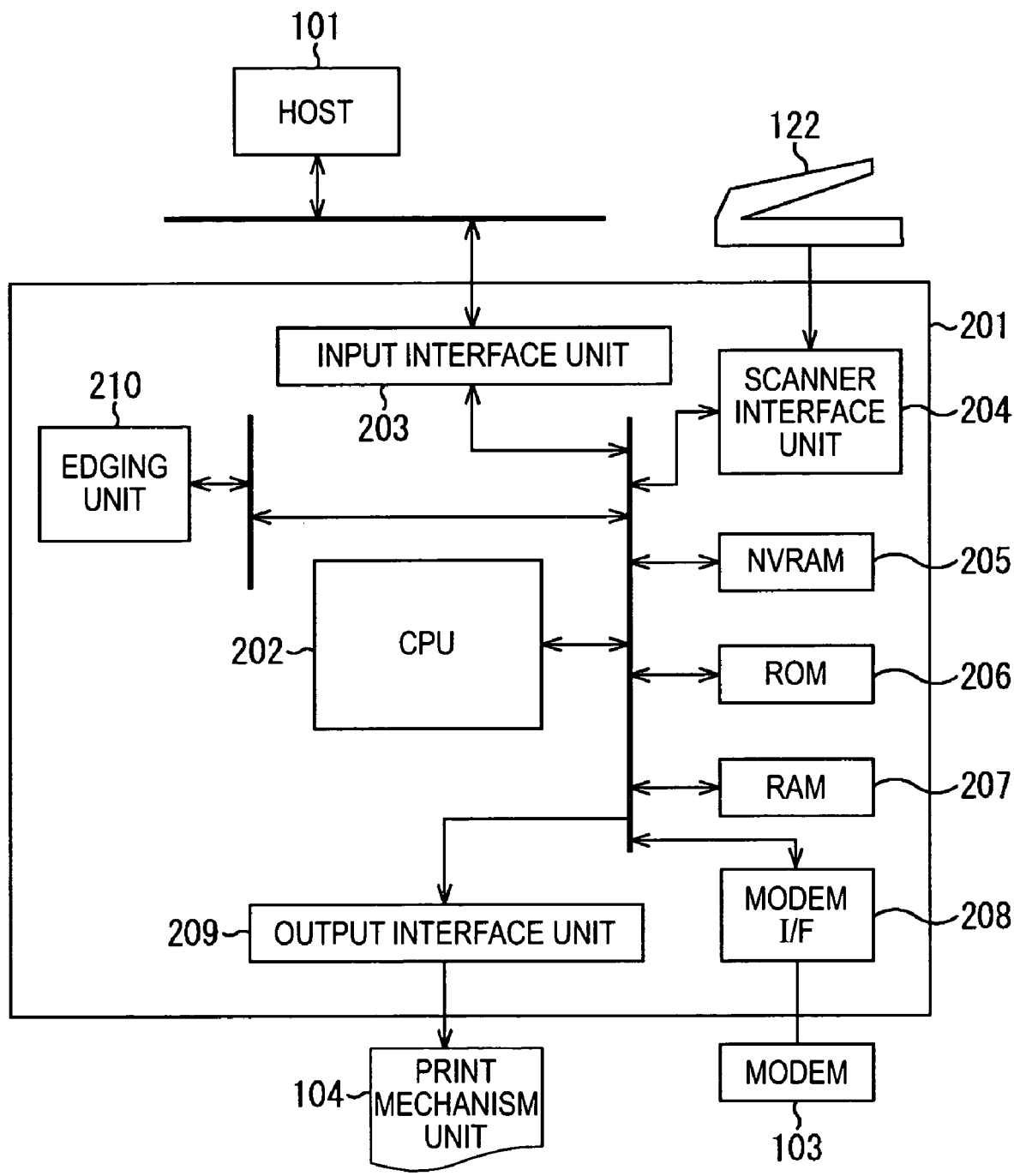
FIG. 2 is a block diagram showing an exemplary architecture of a control unit of the MFP shown in FIG. 1, according to at least on exemplary embodiment of the present invention.

FIG. 2 is a block diagram showing an exemplary architecture of the control unit 501 of the MFP 100 shown in FIG. 1. In FIG. 2, reference numeral 201 represents the body of a controller board. A host computer 101 transfers print data. The host computer 101 includes a printer driver and directly transmits a page-description language (PDL) or internal code created from the PDL by the controller board 201 as the print data. The print data is input via an input interface unit 203.

When an instruction to make a copy is provided through the operating panel 121, an image read by the scanner 122 is then input via a scanner interface unit 204. The input image is subjected to appropriate processing in a central processing unit (CPU) 202, so that it is converted into dot data.

The dot data created in such a manner is sent to a print mechanism unit 104 via an output interface unit 209 and is printed out. Examples of the appropriate processing include a conversion of a reading resolution of the scanner 122 to a printing resolution of the print mechanism unit 104 and a rotation of the input image so that it conforms to the direction of conveying paper in the print mechanism unit 104.

An edging unit 210 is an accelerator (hardware for enhancing the processing speed of personal computers) functioning to create edge data by extracting the edges from compressed images. Generally, the edging unit 210 is dedicated hardware, for example, a controller board composed of an application-specific integrated circuit (ASIC) or composed of a CPU, which is different from the CPU 202, a read-only memory (ROM), and a random-access memory (RAM). The edging unit 210 (the accelerator) can be option in the system, and the edging unit 210 may not be included in the system.

Facsimile data is received from a modem 103 connected to a telephone line via a modem interface (I/F) 208, sent to the CPU 202, subjected to processing executed by the CPU 202, and is then converted into dot data. The created dot data is sent to the print mechanism unit 104 via the output interface unit 209 and printed out.

Examples of the processing performed in this stage include expansion of print data compressed by Huffman coding. The procedure of processing executed by the CPU 202 is all stored as a program in a ROM 206, so that the CPU 202 operates according to the program.

In this exemplary embodiment, converted images are stored in a RAM 207. The RAM 207 includes a memory for a font cache and a memory area for storing intermediate code. The stored images are sent to the print mechanism unit 104 via the output interface unit 209 and printed out.

Data sent from the host computer 101, the scanner 122, and the modem 103 are stored in the RAM 207 and subjected to appropriate processing. A nonvolatile RAM (hereinafter, referred to as NVRAM) 205 includes a general electrically erasable programmable ROM (EEPROM) and stores panel settings specified through the operating panel 121.

First Exemplary Operation

Figure 3:
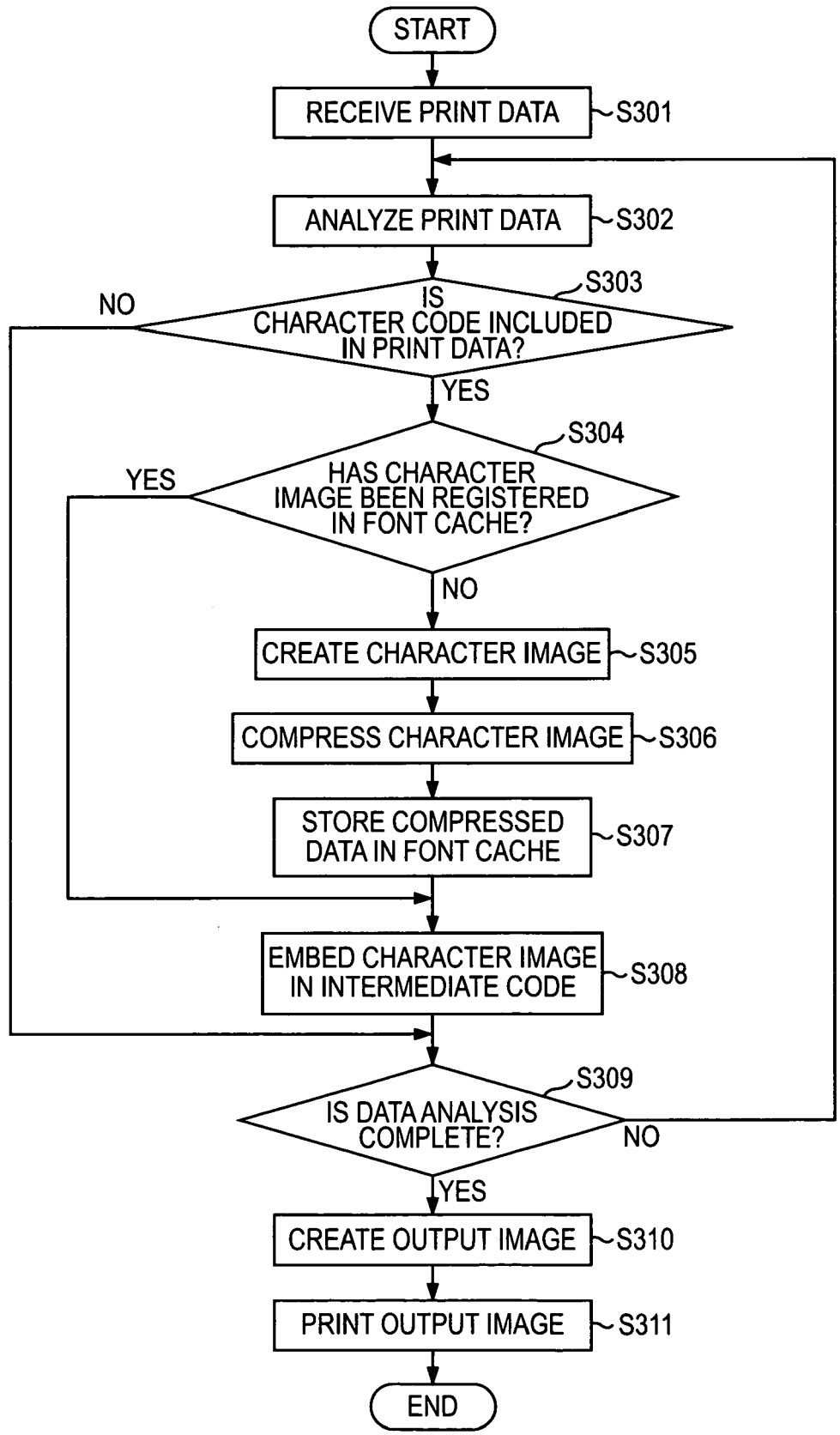
FIG. 3 is a flowchart showing a printing procedure according to a first exemplary embodiment of a printing method.

FIG. 3 is a flowchart for explanation of the first exemplary operation in the image processing apparatus according to at least one exemplary embodiment and shows the operation of the controller board 201 in printing.

Upon starting processing, in step S301, print data input via the input interface unit 203 is received. Then, in step S302, the print data is analyzed, and intermediate code is created.

Next, in step S303, during the analysis of the print data, it is determined whether the print data includes character code.

If, in step S303, the print data includes character code, the processing proceeds to step S304. If, in step S303, the print data does not include character code, the processing skips to step S309. In step S304, it is determined whether a character image corresponding to the character code has been registered in the font cache in the RAM 207.

If, in step S304, the character image has been registered in the font cache, the processing skips to step S308. If, in step S304, the character image has not been registered in the font cache, the processing proceeds to step S305. In step S305, the character image corresponding to the character code is created. It is noted that the creation of character images is not limited to creating character bitmap data from vector data, instead, stored character data may also be loaded in the form of bitmap or compressed data.

Then, in step S306, the character image created in step S305 is compressed, and the processing proceeds to step S307. In step S307, the compressed character image corresponding to the character code is stored in the font cache. Then, in step S308, the character image stored in the font cache is embedded in the intermediate code and is stored in the memory area for storing the intermediate code in the RAM 207.

Then, in step S309, it is determined whether the analysis of the print data is complete. If the analysis is determined not to be complete, the processing returns to step S302, and the steps described above are repeated.

If, in step S309, the analysis is complete, an output image is created from the intermediate code in step S310. Then, in step S311, the created output image is output to the print mechanism unit 104 and printed on paper.

Second Exemplary Operation

Figure 4:
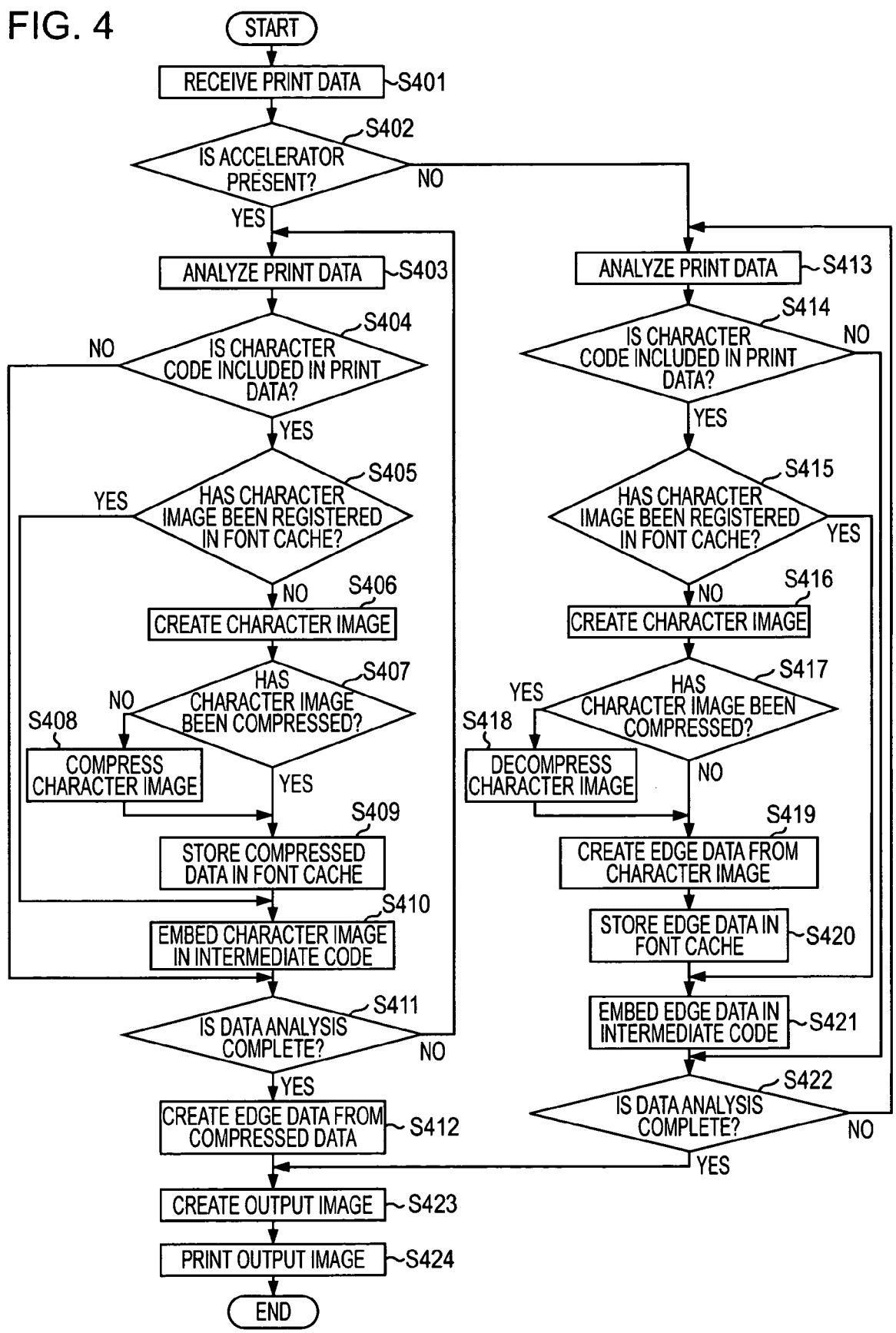
FIG. 4 is a flowchart showing a printing procedure according to a second exemplary embodiment of the printing method.

FIG. 4 is a flowchart for explanation of the second exemplary operation in the image processing apparatus according to at least one exemplary embodiment. In the second exemplary operation, the structure of the controller board is similar to the controller board 201 from FIG. 2. Therefore, the explanation regarding the controller board 201 is omitted. FIG. 4 shows the operation of the controller board 201 in printing with regard to the second exemplary operation.

Upon starting processing, in step S401, the print data input via the input interface unit 203 is received, and the processing then proceeds to step S402. In step S402, it is determined whether an accelerator for creating edge data from compressed character data is present (or available).

If, in step S402, the accelerator is present, the processing proceeds to step S403. In step S403, the print data is analyzed, and creation of the intermediate code starts. Then, in step S404, during the analysis of the print data, it is determined whether the print data includes character code.

If, in step S404, the print data includes character code, the processing proceeds to step S405. If, in step S404, the print data does not include character code, the processing skips to step S411. In step S405, it is determined whether a character image corresponding to the character code has been registered in the font cache. If, in step S405, the character image has been registered, the processing skips to step S410; if, in step S405, the character image has not been registered, the processing proceeds to step S406. In step S406, the character image corresponding to the character code is created. The creation of character images is not limited to creating character bitmap data from vector data, and stored character data may be loaded in the form of bitmap or compressed data.

Then, in step S407, it is determined whether the created character image has been compressed. If, in step S407, the created character image has been compressed, the processing then proceeds to step S409; if, in step S407, the created character image has not been compressed, the processing then proceeds to step S408. In step S408, the created character image is compressed, and the processing then proceeds to step S409. In step S409, the compressed character image is stored in the font cache, and the processing proceeds to step S410.

In step S410, the character image stored in the font cache is embedded in the intermediate code and is stored in the memory area for storing the intermediate code. Then, in step S411, it is determined whether the analysis of the print data is complete. If, in step S411, the analysis is not complete, the processing returns to step S403, and steps S403 to S410 are repeated until the analysis of the print data is complete.

If the result in step S411 is that the analysis of the print data is complete, the processing then proceeds to step S412. In step S412, in a stage of performing rendering on the created intermediate code and creating an output image, edge data is created using the edging unit 210 (the accelerator) from the compressed data. Then, in step S423, the output image is created from the intermediate code, and the processing proceeds to step S424. In step S424, the created output image is output to the print mechanism unit 104 and printed on paper.

If the result in step S402 is that the accelerator for creating edge data from compressed character data is not present, the processing proceeds to step S413. In step S413, the print data is analyzed, and creation of the intermediate code starts.

Then, in step S414, during the analysis of the print data, it is determined whether the print data includes character code. If, in step S414, the print data includes character code, the processing proceeds to step S415. If, in step S414, the print data does not include character code, the processing skips to step S422. In step S415, it is determined whether a character image corresponding to the character code has been registered in the font cache.

If, in step S415, the character image has not been registered, the processing proceeds to step S416. In step S416, the character image corresponding to the character code is created. It is noted that the creation of character images is not limited to creating character bitmap data from vector data. Instead, stored character may also be loaded in the form of bitmap or compressed data.

Then, in step S417, it is determined whether the created character image has been compressed. If, in step S417, the created character image has been compressed, the processing then proceeds to step S418. In step S418, the created character image is decompressed. If, in step S417, the created character image has not been compressed, the processing skips to step S419.

Then, in step S419, edge data is created from the character image. Next, in step S420, the edge data is stored in the font cache. Then, in step S421, the edge data stored in the font cache is embedded in the intermediate code and is stored in the memory area for storing the intermediate code.

Next, in step S422, it is determined whether the analysis of the print data is complete. If, in step S422, the analysis of the print data is not complete, the processing returns to step S413, and steps S413 to S421 are repeated until the analysis of the print data is complete. When the analysis is complete, then in steps S423 and S424 the processings described above are performed.

Third Exemplary Operation

Figure 5:
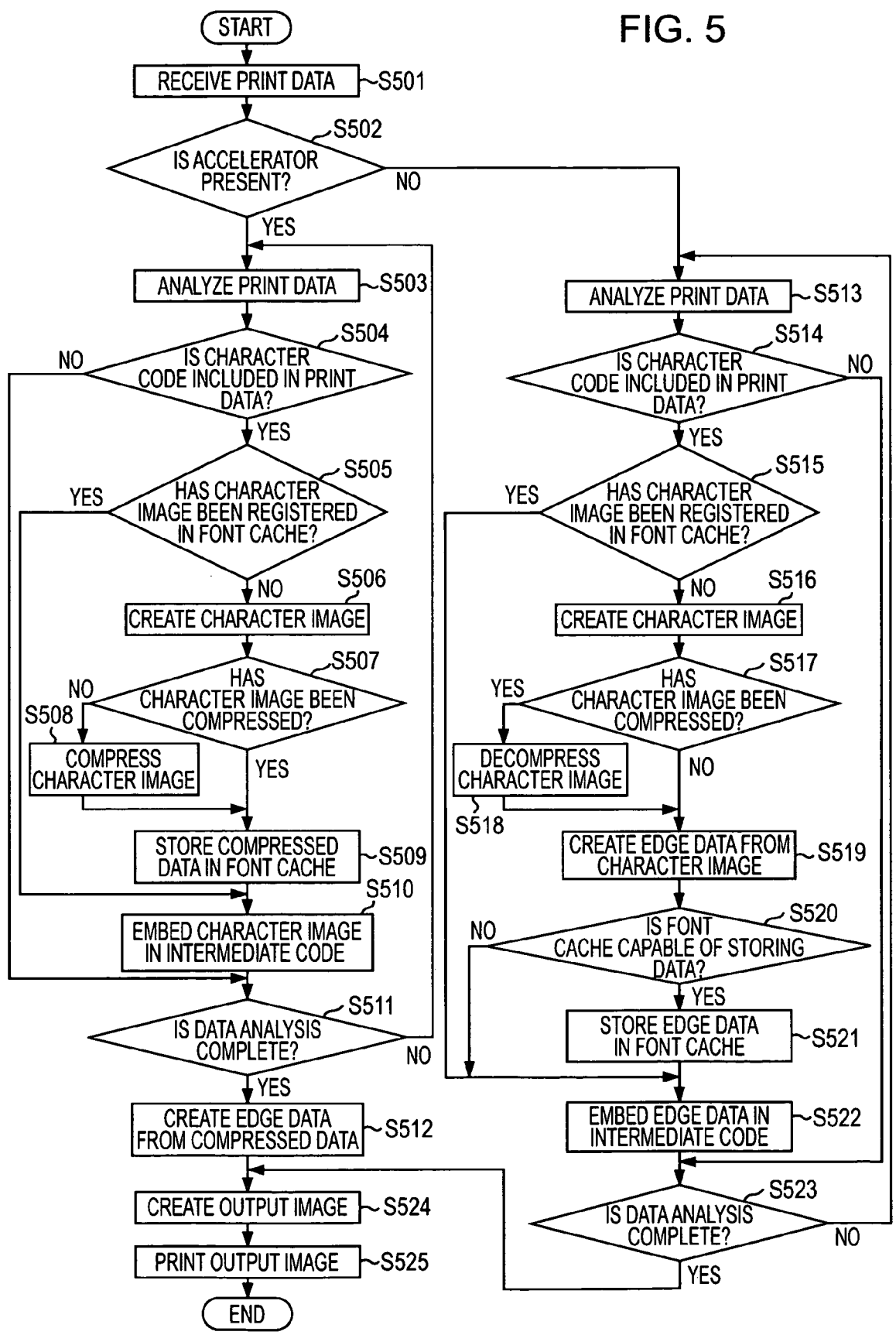
FIG. 5 is a flowchart showing a printing procedure according to a third exemplary embodiment of the printing method.

The third exemplary operation in the image processing apparatus according to at least one exemplary embodiment is described below with reference to FIG. 5. In the third exemplary operation, the structure of the controller board is similar to the controller board 201. Therefore, the explanation regarding the controller board 201 is omitted. FIG. 5 shows the operation of the controller board 201 in printing in the third exemplary operation.

Upon starting processing, in step S501, the print data input via the input interface unit 203 is received, and the processing then proceeds to step S502. In step S502, it is determined whether the accelerator for creating edge data from compressed character data is present (or available). If, in step S502, the accelerator is present, the processing proceeds to step S503. If, in step S502, the accelerator is not present, the processing skips to step S513. In step S503, the print data is analyzed, and creation of the intermediate code starts.

Then, in step S504, during the analysis of the print data, it is determined whether the print data includes character code. If, in step S504, the print data includes character code, the processing proceeds to step S505. If, in step S504, the print data does not include character code, the processing skips to step S511. In step S505, it is determined whether a character image corresponding to the character code has been registered in the font cache. If, in step S505, the character image has been registered, the processing skips to step S510; if, in step S505, the character image has not been registered, the processing proceeds to step S506. In step S506, the character image corresponding to the character code is created. The creation of character images is not limited to creating character bitmap data from vector data, and stored character data may be loaded in the form of bitmap or compressed data.

Then, in step S507, it is determined whether the created character image has been compressed. If, in step S507, the created character image has been compressed, the processing then proceeds to step S509; if, in step S507, the created character image has not been compressed, the processing then proceeds to step S508. In step S508, the created character image is compressed, and the processing then proceeds to step S509. In step S509, the compressed character image is stored in the font cache, and the processing proceeds to step S510. In step S510, the character image stored in the font cache is embedded in the intermediate code and is stored in the memory area for storing the intermediate code.

Then, in step S511, it is determined whether the analysis of the print data is complete. If, in step S511, the analysis is not complete, the processing returns to step S503, and steps S503 to S510 are repeated until the analysis of the print data is complete.

If, in step S511, the analysis of the print data is complete, the processing then proceeds to step S512. In step S512, in a stage of performing rendering on the created intermediate code and creating an output image, edge data is created using the edging unit 210 (the accelerator) from the compressed data.

Then, in step S524, the output image is created from the intermediate code, and the processing proceeds to step S525. In step S525, the created output image is output to the print mechanism unit 104 and printed on paper.

If, in step S502, the accelerator for creating edge data from compressed character data is not present, the processing proceeds to step S513. In step S513, the print data is analyzed, and creation of the intermediate code starts.

Then, in step S514, during the analysis of the print data, it is determined whether the print data includes character code. If, in step S514, the print data includes character code, the processing proceeds to step S515. If, in step S514, the print data does not include character code, the processing proceeds to step S523. In step S515, it is determined whether a character image corresponding to the character code has been registered in the font cache.

If, in step S515, the character image has been registered, the processing skips to step S522; if, in step S515, the character image has not been registered, the processing proceeds to step S516. In step S516, the character image corresponding to the character code is created. The creation of character images is not limited to creating character bitmap data from vector data, and stored character may be loaded in the form of bitmap or compressed data.

Then, in step S517, it is determined whether the created character image has been compressed. If, in step S517, the created character image has been compressed, the processing then proceeds to step S518. In step S518, the created character image is decompressed. Then, in step S519, edge data is created from the character image. If, in step S517, the created character image has not been compressed, the processing proceeds to step S519.

Then, in step S520, it is determined whether the font cache is capable of storing the edge data. If, in step S520, the font cache is capable of storing the edge data, then in step S521 the edge data is stored in the font cache. Then, in step S522, the edge data stored in the font cache is embedded in the intermediate code and is stored in the memory area for storing the intermediate code.

If, in step S520, the font cache is not capable of storing the edge data, the processing proceeds to step S522. In step S522, the created edge data is embedded directly in the intermediate code and is stored in the memory area for storing the intermediate code.

Then, in step S523, it is determined whether the analysis of the print data is complete. If, in step S523, the analysis is not complete, the processing returns to step S513, and steps S513 to S522 are repeated until the analysis of the print data is complete. If, in step S523, the analysis of the print data is complete, then in steps S524 and S525 the output image is created and printed, as previously described.

Fourth Exemplary Operation

Figure 6:
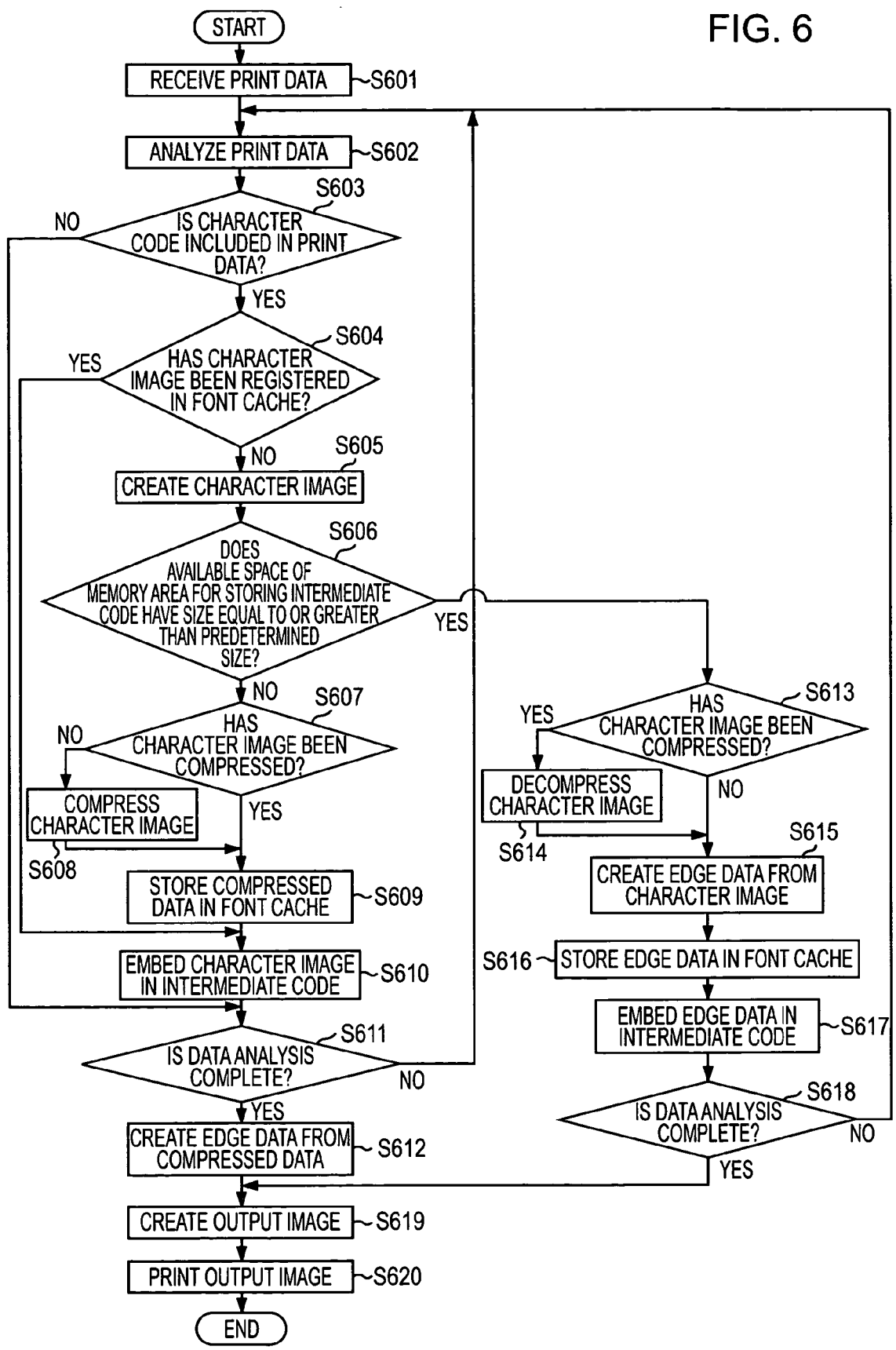
FIG. 6 is a flowchart showing a printing procedure according to a fourth exemplary embodiment of the printing method.

The fourth exemplary operation in the image processing apparatus according to at least one exemplary embodiment is described below with reference to FIG. 6. In the fourth exemplary operation, the structure of the controller board is similar to the controller board 201 from FIG. 2. Therefore, the explanation regarding the controller board 201 is omitted. FIG. 6 shows the operation of the controller board 201 in printing.

Upon starting processing, in step S601, the print data input via the input interface unit 203 is received, and the processing then proceeds to step S602. In step S602, the print data is analyzed, and creation of the intermediate code starts. Then, in step S603, during the analysis of the print data, it is determined whether character code is included in the print data.

If, in step S603, the character code is included in the print data, the processing proceeds to step S604. If, in step S603, the character code is not included in the print data, the processing proceeds to step S611. In step S604, it is determined whether a character image corresponding to the character code has been registered in the font cache. If, in step S604, the character image has been registered, the processing skips to step S610; if, in step S604, the character image has not been registered, the processing proceeds to step S 605. In step S605, the character image corresponding to the character code is created. The creation of character images is not limited to creating character bitmap data from vector data, and stored character data may be loaded in the form of bitmap or compressed data.

If, in step S602, the character code is included in the print data, the processing proceeds to step S604. If, in step S602, the character code is not included in the print data, the processing proceeds to step S611. In step S604, it is determined whether a character image corresponding to the character code has been registered in the font cache. If, in step S604, the character image has been registered, the processing skips to step S610; if, in step S604, the character image has not been registered, the processing proceeds to step S605. In step S605, the character image corresponding to the character code is created. The creation of character images is not limited to creating character bitmap data from vector data, and stored character data may be loaded in the form of bitmap or compressed data.

Then, in step S606, it is determined whether currently available space of the memory area for storing the intermediate code has a size equal to or greater than a predetermined size. If, in step S606, the currently available space of the memory area for storing the intermediate code is less than the predetermined size, then in step S607 it is determined whether the created character image has been compressed. If, in step S607, the created character image has been compressed, the processing proceeds to step S609; if, in step S607, the created character image has not been compressed, the processing proceeds to step S608. In step S608, the created character image is compressed, and the processing proceeds to step S609.

In step S609, the compressed character image is stored in the font cache, and the processing proceeds to step S610. In step S610, the character image stored in the font cache is embedded in the intermediate code and is stored in the memory area for storing the intermediate code.

Then, in step S611, it is determined whether the analysis of the print data is complete. If, in step S611, the analysis is not complete, the processing returns to step S602, and steps S602 to S610 are repeated until the analysis of the print data is complete.

If, in step S611, the analysis of the print data is complete, the processing then proceeds to step S612. In step S612, in a stage of performing rendering on the created intermediate code and creating an output image, edge data is created from the compressed data. Then, in step S619, the output image is created from the intermediate code, and the processing proceeds to step S620. In step S620, the created output image is output to the print mechanism unit 104 and printed on paper.

If, in step S606, the currently available space of the memory area for storing the intermediate code is a size equal to or greater than the predetermined size, then in step S613 it is determined whether the created character image has been compressed. If, in step S613, the created character image has not been compressed, the processing proceeds to step S615; if, in step S613, the created character image has been compressed, the processing proceeds to step S614. In step S614, the created character image is decompressed, and the processing proceeds to step S615. In step S615, edge data is created from the character image. Then, in step S616, the edge data is stored in the font cache.

Then, in step S617, the edge data stored in the font cache is embedded in the intermediate code and is stored in the memory area for storing the intermediate code. Then, in step S618, it is determined whether the analysis of the print data is complete. If the analysis is determined not to be complete, the processing returns to step S602, and steps S602 to S617, which are described above, are repeated until the analysis of the print data is complete.

If, in step S618, the analysis of the print data is complete, the processing proceeds to step S619. In step S619, the output image is created, and in step S620, the output image is printed, as previously described.

Fifth Exemplary Operation

Figure 7:
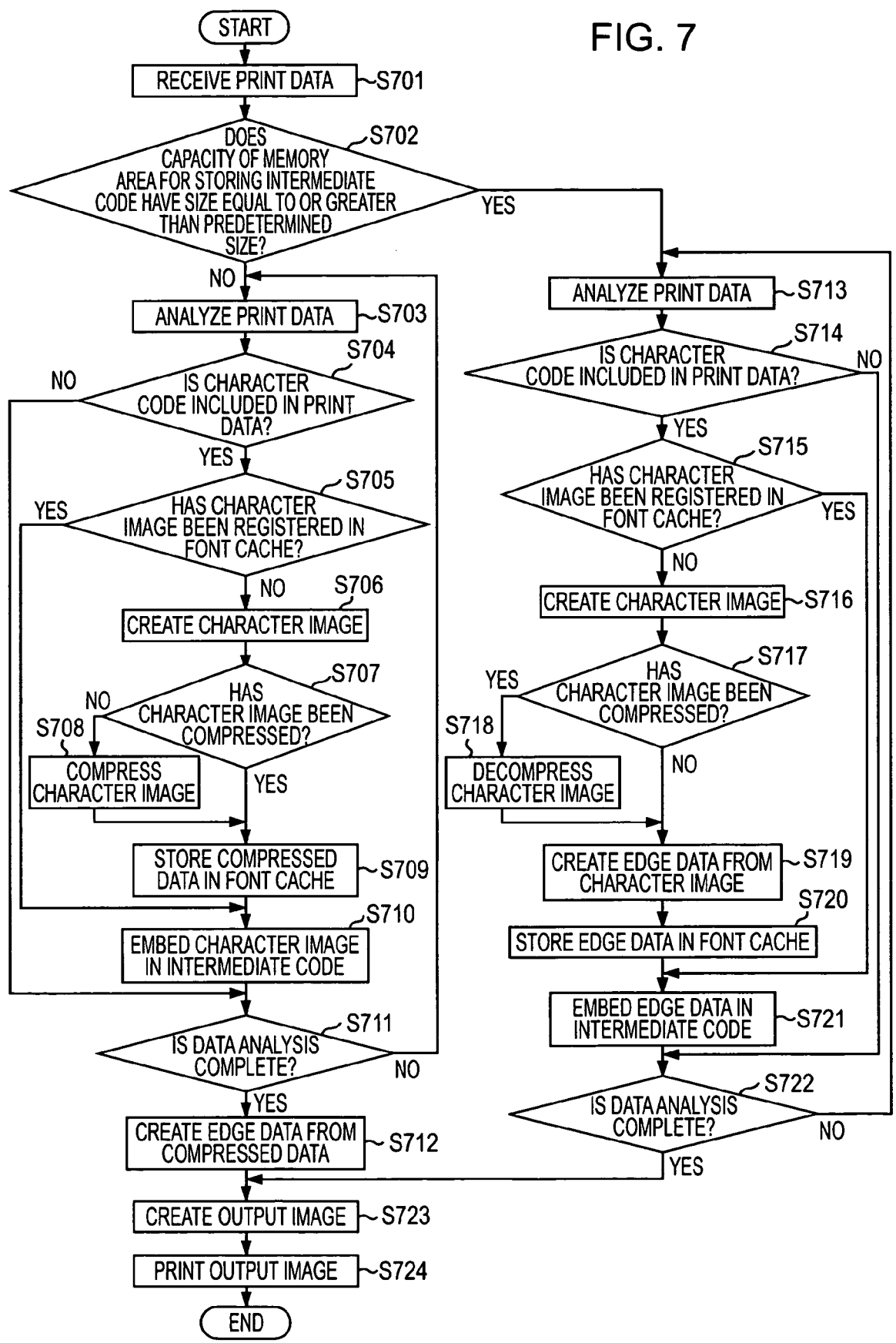
FIG. 7 is a flowchart showing a printing procedure according to a fifth exemplary embodiment of the printing method.

FIG. 7 is a flowchart for explanation of the fifth exemplary operation in the image processing apparatus according to at least one exemplary embodiment. In the fifth exemplary operation, the structure of the controller board is similar to the controller board 201. Therefore, the explanation regarding the controller board 201 is omitted. FIG. 7 shows the operation of the controller board 201 in printing.

Upon starting processing, in step S701, the print data input via the input interface unit 203 is received, and the processing then proceeds to step S702. In step S702, it is determined whether the capacity of the memory area for storing the intermediate code has a size equal to or greater than a predetermined size. If, in step S702, the capacity of the memory area for storing the intermediate code does not reach the predetermined size, the processing then proceeds to step S703. In step S703, the print data is analyzed, and creation of the intermediate code starts.

Then, in step S704, during the analysis of the print data, it is determined whether character code is included in the print data. If, in step S704, character code is included in the print data, the processing proceeds to step S705. If, in step S704, character code is not included in the print data, the processing proceeds to step S711. In step S705, it is determined whether a character image corresponding to the character code has been registered in the font cache.

If, in step S705, the character image has not been registered, the processing proceeds to step S706. If, in step S705, the character image has been registered, the processing proceeds to step S710. In step S706, the character image corresponding to the character code is created. The creation of character images is not limited to creating character bitmap data from vector data, and stored character data may be loaded in the form of bitmap or compressed data.

Then, in step S707, it is determined whether the created character image has been compressed. If, in step S707, the created character image has not been compressed, the processing then proceeds to step S708. If, in step S707, the created character image has been compressed, the processing proceeds to step S709. In step S708, the created character image is compressed.

Then, in step S709, the compressed character image is stored in the font cache. Then, in step S710, the character image stored in the font cache is embedded in the intermediate code and is stored in the memory area for storing the intermediate code.

Then, in step S711, it is determined whether the analysis of the print data is complete. If, in step S711, the analysis of the print data is not complete, the processing returns to step S703, and steps S703 to S710 are repeated until the analysis of the print data is complete.

If, in step S711, the analysis of the print data is complete, the processing then proceeds to step S712. In step S712, in a stage of performing rendering on the created intermediate code and creating an output image, edge data is created from the compressed data.

Then, in step S723, when the intermediate code is created, the output image is then created from the intermediate code.

Then, in step S724, the created output image is output to the print mechanism unit 104 and printed on paper.

If, in step S702, the capacity of the memory area for storing the intermediate code has a size equal to or greater than the predetermined size, the processing then proceeds to step S713. In step S713, the print data is analyzed, and creation of the intermediate code starts. Then, in step S714, during the analysis of the print data, it is determined whether character code is included in the print data.

If, in step S714, character code is included in the print data, the processing proceeds to step S715. If, in step S714, character code is not included in the print data, the processing proceeds to step S722. In step S715, it is determined whether a character image corresponding to the character code has been registered in the font cache. If, in step S715, the character image has not been registered, the processing proceeds to step S716. If, in step S715, the character image has been registered, the processing proceeds to step S721. In step S716, the character image corresponding to the character code is created. It is noted that the creation of character images is not limited to creating character bitmap data from vector data. Rather, stored characters may also be loaded in the form of bitmap or compressed data.

Then, in step S717, it is determined whether the created character image has been compressed. If, in step S717, the created character image has not been compressed, the processing proceeds to step S719; if, in step S717, the created character image has been compressed, the processing then proceeds to step S718. In step S718, the created character image is decompressed, and the processing then proceeds to step S719. In step S719, edge data is created from the character image.

Then, in step S720, the edge data is stored in the font cache. Then, in step S721, the edge data stored in the font cache is embedded in the intermediate code and is stored in the memory area for storing the intermediate code.

Then, in step S722, it is determined whether the analysis of the print data is complete. If, in step S722, the analysis of the print data is not complete, the processing returns to step S713, and steps S713 to S721 are repeated. Then, in steps S723 and S724, the processing described above is performed.

Sixth Exemplary Operation

Figure 8:
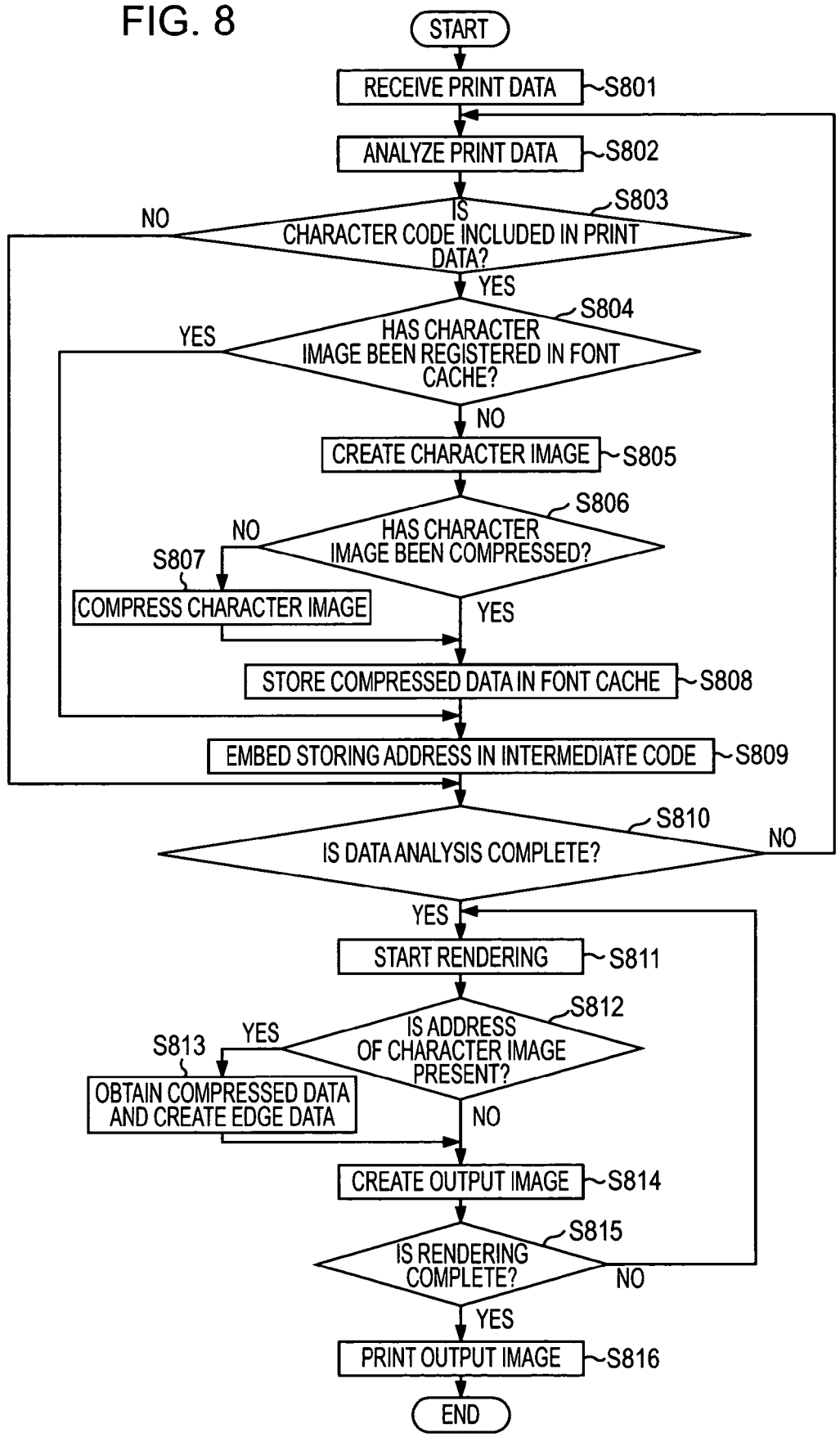
FIG. 8 is a flowchart showing a printing procedure according to a sixth exemplary embodiment of the printing method.

FIG. 8 is a flowchart for explanation of the sixth exemplary operation in the image processing apparatus according to at least one exemplary embodiment. In the sixth exemplary operation, the structure of the controller board is similar to the controller board 201 from FIG. 2. Therefore, the explanation regarding the controller board 201 is omitted. FIG. 8 shows the operation of the controller board 201 in printing.

Upon starting processing, in step S801, the print data input via the input interface unit 203 is received, and the processing then proceeds to step S802. In step S802, the print data is analyzed, and creation of the intermediate code starts. Then, in step S803, during the analysis of the print data, it is determined whether character code is present in the print data.

If, in step S803, character code is present in the print data, the processing proceeds to step S804. If, in step S803, character code is not present in the print data, the processing proceeds to step S810. In step S804, it is determined whether a character image corresponding to the character code has been registered in the font cache. If, in step S804, the character image has not been registered, the processing proceeds to step S805. If, in step S804, the character image has been registered, the processing proceeds to step S809. In step S805, the character image corresponding to the character code is created. The creation of character images is not limited to creating character bitmap data from vector data, and stored character data may be loaded in the form of bitmap or compressed data.

Then, in step S806, it is determined whether the created character image has been compressed. If, in step S806, the created character image has not been compressed, the processing then proceeds to step S807. If, in step S806, the created character image has been compressed, the processing proceeds to step S808. In step S807, the created character image is compressed. Then, in step S808, the compressed character image is stored in the font cache. Then, in step S809, a storing address of the character image stored in the font cache is embedded in the intermediate code and is stored in the memory area for storing the intermediate code.

Then, in step S810, it is determined whether the analysis of the print data is complete. If, in step S810, the analysis of the print data is not complete, the processing returns to step S802, and steps S802 to S809 are repeated until the analysis of the print data is complete.

If, in step S810, the analysis of the print data is complete, the processing then proceeds to step S811. In step S811, rendering starts, the intermediate code is created, and creation of an output image from the intermediate code starts.

In step S812, it is determined whether the address of the character image is present in the intermediate code. If, in step S812, the address is present in the intermediate code, the processing then proceeds to step S813. If, in step S812, the address is not present in the intermediate code, the processing proceeds to step S814. In step S813, the compressed data is read from the location indicated by the address, and the edge data is created.

Then, in step S814, the output image is created from the intermediate code. Then, in step S815, it is determined whether the creation of the output image from the intermediate code is complete. If, in step S815, the creation of the output image is complete, the processing then proceeds to step S816. In step S816, the created output image is output to the print mechanism unit 104 and printed on paper. If, in step S815, the creation of the output image is not complete, the processing returns to step S811, and steps S811 to S814 are repeated.

Seventh Exemplary Operation

Figure 9:
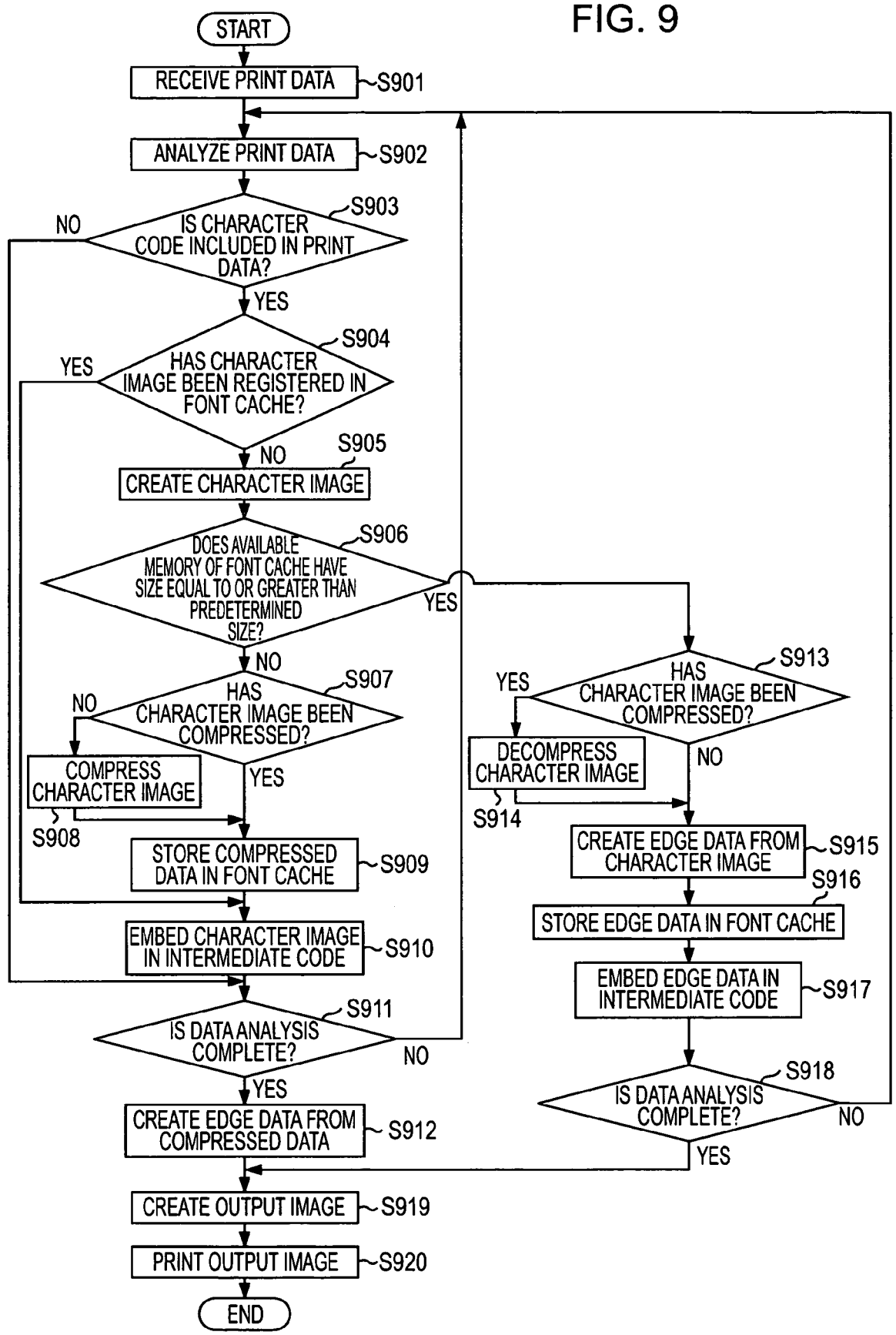
FIG. 9 is a flowchart showing a printing procedure according to a seventh exemplary embodiment of the printing method.

The seventh exemplary operation in the image processing apparatus according to at least one exemplary embodiment is described below with reference to FIG. 9. In the seventh exemplary operation, the structure of the controller board is similar to the controller board 201 from FIG. 2. Therefore, the explanation regarding the controller board 201 is omitted. FIG. 9 shows the operation of the controller board 201 in printing.

Upon starting processing, in step S901, the print data input via the input interface unit 203 is received, and the processing then proceeds to step S902. In step S902, the print data is analyzed, and creation of the intermediate code starts.

Then, in step S903, during the analysis of the print data, it is determined whether character code is included in the print data. If, in step S903, character code is included in the print data, the processing proceeds to step S904. If, in step S903, character code is not included in the print data, the processing proceeds to step S911. In step S904, it is determined whether a character image corresponding to the character code has been registered in the font cache. If, in step S904, the character image has not been registered, the processing proceeds to step S905. If, in step S904, the character image has been registered, the processing proceeds to step S910. In step S905, the character image corresponding to the character code is created. The creation of character images is not limited to creating character bitmap data from vector data, and stored character data may be loaded in the form of bitmap or compressed data.

Then, in step S906, it is determined whether currently available memory of the font cache has a size equal to or greater than a predetermined size. If, in step S906, the currently available memory of the font cache is less than the predetermined size, the processing then proceeds to step S907.

In step S907 it is determined whether the created character image has been compressed. If, in step S907, the created character image has not been compressed, the processing proceeds to step S908. If, in step S907, the created character image has been compressed, the processing proceeds to step S909. In step S908, the created character image is compressed, and the processing proceeds to step S909. In step S909, the compressed character image is stored in the font cache.

Then, in step S910, the character image stored in the font cache is embedded in the intermediate code and is stored in the memory area for storing the intermediate code. Then, in step S911, it is determined whether the analysis of the print data is complete. If, in step S911, the analysis is not complete, the processing returns to step S902, and steps S902 to S910 are repeated until the analysis of the print data is complete.

If, in step S911, the analysis of the print data is complete, the processing then proceeds to step S912. In step S912, in a stage of performing rendering on the created intermediate code and creating an output image, edge data is created from the compressed data. Then, in step S919, the output image is created from the intermediate code, and the processing proceeds to step S920. In step S920, the created output image is output to the print mechanism unit 104 and printed on paper.

If, in step S906, the currently available memory of the font cache has a size equal to or greater than the predetermined size, then in step S913 it is determined whether the created character image has been compressed. If, in step S913, the created character image has been compressed, the processing proceeds to step S914. If, in step S913, the created character image has not been compressed, the processing proceeds to step S915. In step S914, the created character image is decompressed.

Then, in step S915, edge data is created from the character image. Then, in step S916, the edge data is stored in the font cache. Then, in step S917, the edge data stored in the font cache is embedded in the intermediate code and is stored in the memory area for storing the intermediate code.

Then, in step S918, it is determined whether the analysis of the print data is complete. If, in step S918, the analysis is not complete, the processing returns to step S902, and steps S902 to S917 are repeated until the analysis of the print data is complete.

If, in step S918, the analysis of the print data is complete, then in steps S919 and S920 creation of the output image and printing the output image are performed in succession, as previously described.

Eighth Exemplary Operation

Figure 10:
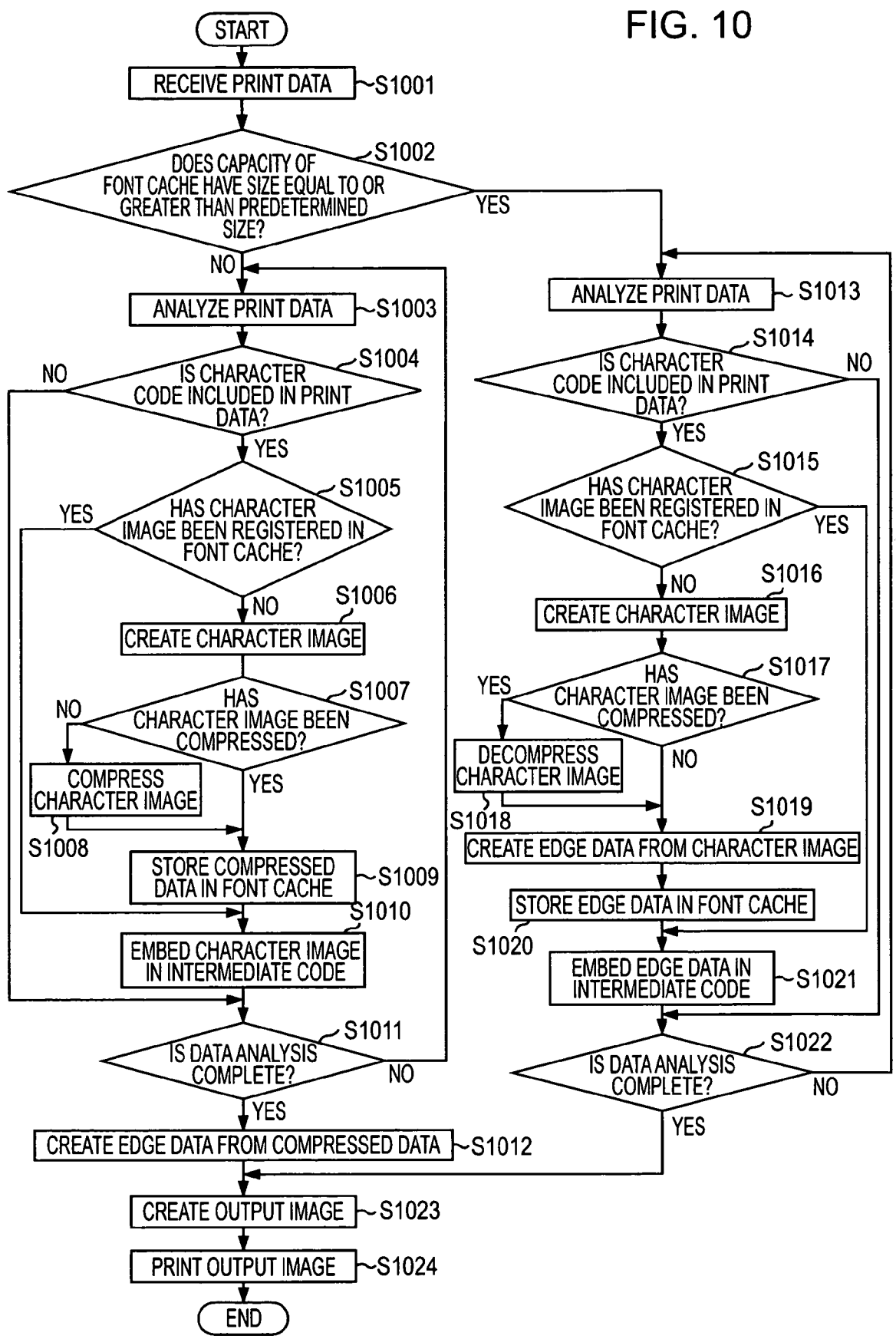
FIG. 10 is a flowchart showing a printing procedure according to an eighth exemplary embodiment of the printing method.

FIG. 10 is a flowchart for explanation of the eighth exemplary operation in the image processing apparatus according to at least one exemplary embodiment. In the eighth exemplary operation, the structure of the controller board is similar to the controller board 201 from FIG. 2. Therefore, the explanation regarding the controller board 201 is omitted. FIG. 10 shows the operation of the controller board 201 in printing.

Upon starting processing, in step S1001, the print data input via the input interface unit 203 is received. Then, in step S1002, it is determined whether the capacity of the font cache has a size equal to or greater than a predetermined size. If, in step S1002, the capacity of the font cache is less than the predetermined size, then in step S1003 the print data is analyzed, and creation of the intermediate code starts.

Then, in step S1004, during the analysis of the print data, it is determined whether character code is present in the print data. If, in step S1004, character code is present in the print data, the processing proceeds to step S1005. If, in step S1004, character code is not present in the print data, the processing proceeds to step S1011. In step S1005, it is determined whether a character image corresponding to the character code has been registered in the font cache. If, in step S1005, the character image has not been registered, the processing proceeds to step S1006. If, in step S1005, the character image has been registered, the processing proceeds to step S1010. In step S1006, the character image corresponding to the character code is created. The creation of character images is not limited to creating character bitmap data from vector data, and stored character data may be loaded in the form of bitmap or compressed data.

Then, in step S1007, it is determined whether the created character image has been compressed. If, in step S1007, the created character image has not been compressed, the processing then proceeds to step S1008. If, in step S1007, the created character image has been compressed, the processing proceeds to step S1009. In step S1008, the created character image is compressed.

Then, in step S1009, the compressed character image is stored in the font cache. Then, in step S1010, the character image stored in the font cache is embedded in the intermediate code and is stored in the memory area for storing the intermediate code. Then, in step S1011, it is determined whether the analysis of the print data is complete. If, in step S1011, the analysis of the print data is not complete, the processing returns to step S1003, and steps S1003 to S1010 are repeated until the analysis of the print data is complete.

If, in step S1011, the analysis of the print data is complete, the processing then proceeds to step S1012. In step S1012, in a stage of performing rendering on the created intermediate code and creating an output image, edge data is created from the compressed data. Then, in step S1023, the output image is created from the intermediate code, and the processing proceeds to step S1024. In step S1024, the created output image is output to the print mechanism unit 104 and printed on paper.

If, in step S1002, the capacity of the font cache has a size equal to or greater than the predetermined size, the processing then proceeds to step S1013. In step S1013, the print data is analyzed, and creation of the intermediate code starts. Then, in step S1014, during the analysis of the print data, it is determined whether character code is present in the print data. If, in step S1014, the character code is present in the print data, the processing proceeds to step S1015. If, in step S1014, the character code is not present in the print data, the processing proceeds to step S1022. In step S1015, it is determined whether a character image corresponding to the character code has been registered in the font cache.

If, in step S1015, the character image has not been registered, the processing proceeds to step S1016. If, in step S1015, the character image has been registered, the processing proceeds to step S1021. In step S1016, the character image corresponding to the character code is created. The creation of character images is not limited to creating character bitmap data from vector data, and stored character may be loaded in the form of bitmap or compressed data.

Then, in step S1017, it is determined whether the created character image has been compressed. If, in step S1017, the created character image has been compressed, the processing then proceeds to step S1018. In step S1018, the created character image is decompressed, and the processing then proceeds to step S1019. If, in step S1017, the created character image has not been compressed, the processing proceeds to step S1019. In step S1019, edge data is created from the character image.

Then, in step S1020, the edge data is stored in the font cache. Then, in step S1021, the edge data stored in the font cache is embedded in the intermediate code and is stored in the memory area for storing the intermediate code.

Then, in step S1022, it is determined whether the analysis of the print data is complete. If, in step S1022, the analysis of the print data is not complete, the processing returns to step S1013, and steps S1013 to S1021 are repeated until the analysis of the print data is complete.

If, in step S1022, the analysis of the print data is complete, the processing proceeds to step S1023. In step S1023, the output image is created. Then, in step S1024, the created output image is output to the print mechanism unit 104 and printed on paper.

Other Exemplary Embodiments

Each unit in the image processing apparatus according to the exemplary embodiments described above and each step in the image processing method can be realized by the operation of a program stored in a RAM and/or ROM in a computer. Furthermore, the program may be stored in any form of computer-readable storage medium.

The present invention is applicable to, for example, a system, an apparatus, a method, a program, a storage medium, and some combination thereof. Moreover, the present invention is applicable to a system including a plurality of devices and to an apparatus composed of a single device.

The present invention can be realized by supplying a program corresponding to the flowcharts shown in FIGS. 3 to 10 directly or remotely to a system or an apparatus and reading and executing the supplied program by a computer of the system or the apparatus.

Further, program code may be installed in a computer in order to realize the functional processing of the present invention by the computer. In other words, the present invention is applicable to a computer program for implementing the functional processing of the present invention. In this case, the program may have any form, such as object code, a program executable by an interpreter, script data to be supplied to an operating system (OS), or some combination thereof, as long as it has the functions of the program.

Examples of storage media for supplying a program include, but is not limited thereto, a flexible disk, a hard disk, an optical disk, a magneto-optical disk (MO), a compact disk read-only memory (CD-ROM), a CD recordable (CD-R), a CD-Rewritable (CD-RW), magnetic tape, a nonvolatile memory card, a ROM, a digital versatile disk-ROM (DVD-ROM), a DVD-R, and the like.

Examples of methods for supplying a program include, but are not limited thereto, connecting to a website on the Internet using a browser of a client computer and downloading a compressed file of a computer program, downloading a compressed file of a program with an automatic installer from the website to a storage medium (e.g., a hard disk), and the like.

In this case, program code constituting the program according to the present invention may be divided into a plurality of files and each file may be downloaded from different websites. In other words, a World Wide Web (WWW) server may allow a program file for realizing the functional processing of the present invention by a computer to be downloaded to a plurality of users.

Encrypting a program according to the present invention, storing the encrypted program in storage media, such as CD-ROMS, distributing them to users, allowing a user who satisfies a predetermined condition to download information regarding a decryption key from a website over the Internet and to execute the encrypted program using the information regarding the key, thereby enabling the user to install the program in a computer can realize the functions of the present invention.

Executing a read program by a computer can realize the functions of the embodiment described above. In addition, performing actual processing in part or in entirety by an operating system (OS) running on a computer in accordance with instructions of the program can realize the functions of the embodiment described above.

Moreover, a program read from a storage medium is written on a memory included in a feature expansion board inserted into a computer or in a feature expansion unit connected to the computer, and a CPU included in the feature expansion board or the feature expansion unit may perform actual processing in part or in entirety in accordance with instructions of the program, thereby realizing the functions of the embodiment described above.

While the present invention has been described with reference to exemplary embodiments, it is to be understood that the invention is not limited to the disclosed exemplary embodiments. Hence, the scope of the following claims is to be accorded the broadest interpretation so as to encompass all embodiments, equivalent structures and functions of the present invention.

This application claims the benefit of Japanese Application No. 2004-311415 filed Oct. 26, 2004, which is hereby incorporated by reference herein in its entirety.

What is claimed is:

1. An image processing apparatus comprising: using a processor to perform;
   - a determination unit configured to determine whether an accelerator for creating edge data from compressed image is present;
   - a holding unit configured, when the determination unit determines the accelerator is present, to compress, without edging, a first image generated based in print data, to create an intermediate code including the compressed first image and to hold the created intermediate code, when the determination unit determines the accelerator is not present, to edge the first image generated based on print data, to create an intermediate code including the edged first image and to hold the created intermediate code; and
   - a generating unit configured, when the accelerator is present, to create edge data based on the compressed first image included in the intermediate code held by the holding unit, to generate a second image based on the created edge data, when the accelerator is not present, to generate the second image based on the edged first image included in the intermediate code held by the holding unit.

2. The image processing apparatus according to claim 1, further comprising a memory configured to store the edged image.

3. The image processing apparatus according to claim 2,
wherein the holding unit holds the compressed image of the image after the image is compressed without being subjected to edging when an available space of the memory is less than a predetermined size, and
wherein the holding unit holds the edged image of the image after the image is subjected to edging when the available space of the memory is equal to or greater than the predetermined size.

4. The image processing apparatus according to claim 1, further comprising a printing unit configured to print the image created by the creating unit.

5. The image processing apparatus according to claim 1,
wherein the compressed image or the edged image includes a character image, and
wherein the character image is held in a font cache.

6. An image processing method comprising:
determining whether an accelerator for creating edge data from a compressed image is present;
when it is determined the accelerator is present, compressing, without edging, a first image generated based in print data, to create an intermediate code including the compressed first image and holding the created intermediate code; when it is determined the accelerator is not present, edging the first image generated based on print data, to create an intermediate code including the edged first image and holding the created intermediate code; and
when the accelerator is present, creating edge data based on the compressed first image included in the held intermediate code, to generate a second image based on the created edge data, when the accelerator is not present, to generate the second image based on the edged first image included in the held intermediate code.

7. The image processing method according to claim 6, further comprising determining whether an available space of a memory for storing the edged image is less than a predetermined size.

8. The image processing method according to claim 7,
wherein the holding includes holding the compressed image of the image after the image is compressed without being subjected to edging when the available space of the memory is less than the predetermined size, and
wherein the holding includes holding the edged image of the image after the image is subjected to edging when the available space of the memory is equal to or greater than the predetermined size.

9. The image processing method according to claim 6, further comprising printing the created image.

10. The image processing method according to claim 6,
wherein the compressed image or the edged image includes a character image, and
wherein the character image is held in a font cache.

11. A computer readable storage medium: containing computer-executable instructions for controlling an image processing apparatus, the medium comprising:

computer-executable instructions for determining whether an accelerator for creating edge data from a compressed image is present;
when it is determined the accelerator is present, computer-executable instructions for compressing, without edging, a first image generated based in print data, to create an intermediate code including the compressed first image and holding the created intermediate code;
when it is determined the accelerator is not present, computer-executable instructions for edging the first image generated based on print data, to create an intermediate code including the edged first image and holding the created intermediate code; and
computer-executable instructions for, when the accelerator is present, creating edge data based on the compressed first image included in the held intermediate code, to generate a second image based on the created edge data, when the accelerator is not present, to generate the second image based on the edged first image included in the held intermediate code.

12. The computer readable medium according to claim 11, further comprising computer-executable instructions for determining whether an available space of a memory for storing the edged image is less than a predetermined size.

13. The computer readable medium according to claim 12,
wherein the computer-executable instructions for holding includes holding the compressed image of the image after the image is compressed without being subjected to edging when the available space of the memory is less than the predetermined size, and
wherein the computer-executable instructions for holding includes holding the edged image of the image after the image is subjected to edging when the available space of the memory is equal to or greater than the predetermined size.

14. The computer readable medium according to claim 11, further comprising computer-executable instructions for printing the created image.

15. The computer readable medium according to claim 11,
wherein the compressed image or the edged image includes a character image, and
wherein the character image is held in a font cache.

16. The image processing apparatus according to claim 1, wherein the first image includes a character image and the second image includes an output image.

17. The image processing method according to claim 14, wherein the first image includes a character image and the second image includes an output image.

18. The computer readable medium according to claim 11, wherein the first image includes a character image and the second image includes an output image.

19. The image processing apparatus according to claim 1, further comprising a printing unit configured to execute printing based on the second image.

* * * * *